Patented June 30, 1936

2,046,015

UNITED STATES PATENT OFFICE 2,046,015

ADHESIVES AND PRODUCTS DERIVED THEREFROM

Hugh Mills Bunbury, Robert Bertram Fisher Frank Clarke, and William John Roy Evans, Blackley, Manchester, England, assignors to Imperial Chemical Industries Limited, a corporation of Great Britain No Drawing. Application December 29, 1933, Serial No. 704,592. In Great Britain January 5, 1933

11 Claims. (Cl. 134—17)

In British Patent No. 357,238 and U. S. patent application Serial No. 543,382, filed June 10, 1931, there is described a process for the manufacture of new adhesive materials from rubber latex comprising creaming by the addition of a weak organic acid without coagulating the latex, adding a strong acid or acid-forming substance, heating the mixture to remove volatile matter and baking the residue until reaction takes place.

According to the present invention new or improved adhesive materials may be obtained by treating a latex preferably of high rubber content with a stabilizer of the type used in copending British application No. 34,398/32, and U. S. application Serial No. 698,586, filed Nov. 18, 1933, that is a compound of the class represented by the general formula A—$SO_3H$ or an alkali or ammonium salt thereof (where A represents the radicals R or RX and R represents an aliphatic saturated or unsaturated hydrocarbon radical containing an alkyl chain of not less than 10 carbon atoms, and X represents an oxygen atom or an oxygen-containing link), adding a strong acid or acid-forming substance, heating the mixture to remove volatile matter and baking the residue until reaction takes place.

Suitable stabilizers are, for example, sulphuric esters of spermaceti alcohols, of dodecyl alcohol, of hexadecyl alcohol, or of oleyl alcohol; also hexadecanesulphonic acid and sulphonated higher paraffins generally, cetyl sulphoacetate, cetyl sulphobenzyl ether, octodecenyl-$\beta$-sulphoethyl ether, and the like. It is to be understood that by the expression "alkylsulphonic acid or alkylsulphuric ester" in this specification and in the claims we mean compounds having the general formula A—$SO_3H$ as above defined, including the compounds now specifically mentioned, and alkali or ammonium salts of any of these acids or esters.

Suitable acids or acid-forming substances (referred to inclusively in the claims as acid bodies) are, for example: sulphuric acid, phenolsulphonic acid, a mixture of phenol and sulphuric acid, sodium hydrogen sulphate, aluminium sulphate, zinc sulphate, phosphoric acid, benzenesulphonic acid, acetyl sulphuric acid, and the like acids or acid-generating substances.

Oils and substances of rubber softener type can be added to the latex stabilizer mixture before the addition of the acid and have the effect of lowering the softening and melting temperature of the resulting adhesives.

The properties of these adhesives are such as make them very suitable for the manufacture of a great variety of artificial compositions.

Also, according to the present invention we manufacture new or improved compositions from these adhesive materials by a process which comprises submitting the adhesive materials with or without added substances to the action of heat, pressure or solvents.

In this process we include the use of the new adhesive materials as a unifying agent, that is for aggregating, consolidating, concreting or sticking together discrete portions of matter. Thus abrasive wheels, discs, blocks, sheets, fabrics, etc., may be manufactured by admixing the adhesive materials with sand, carborundum, glass, emery, etc., and submitting to the action of heat; asbestos may be mixed with the adhesive materials compounded with sulphur, cured under pressure and heat-stamped or moulded for jointings, brakelinings etc.; pumiceous or spongy masses, which may be thermoplastic, paper or other similar sheet or stratifiable materials may be impregnated with the adhesives and compressed to form boards or other shapes for electrical work. Instead of using the adhesives to hold together particles of a body of different composition, particles of the adhesive material themselves can be joined together, for instance, by pressure; thus a microporous rubber conversion product, such as plates, rods, etc., may be obtained by grinding the solid adhesive material and compressing the grains, for instance, to a desired shape. Such products are suitable as filter media, inert separators for battery plates etc.

In the process we also include the use of the new adhesive substances in compositions of a homogeneous character, such as fluids which are bases for paints, or lacquers or other coating compositions or transparent shapes of the solid materials such as sheets or solid compounded intimate mixtures with, for instance rubber. As an instance of use as a coating composition there may be mentioned the production of coloured, transparent or opaque films of the pigmented or dyed new adhesive materials for colouring glass, e. g. electric light bulbs.

Generally the products are resistant to acid and alkali and in addition when they are vulcanized they are also oil-resistant.

The invention also includes the products of the above described processes.

The following examples in which parts are by weight illustrate but do not limit the invention.

Example 1

25 parts of a 15% aqueous paste of the sodium salt of the sulphuric ester of the alcohols from spermaceti are dissolved in 10 parts of hot water, the solution is allowed to cool and is added to 100 parts of latex containing approximately 60% of rubber. 100 parts of 15% sulphuric acid are then added, and carefully stirred, when the mixture thickens without coagulating. The thickened mixture is transferred to trays, dried at 60–70° C. and the dry coagulum is baked at 130° C. for two hours, milled, washed with water until acid-free, then milled until homogeneous.

Instead of sulphuric acid phenol sulphonic acid or phenol and sulphuric acid may be used and give similar results.

The product is a black resinous mass, hard and brittle at room temperature, breaking with conchoidal fracture, softening about 80° C., and melting about 300° C. and is completely soluble in hydrocarbon solvents.

By the addition of 10 parts of castor oil to the latex-sulphuric ester mixture, the softening temperature of the resultant product is lowered to 40° C.

Example 2

3 parts of the sodium salt of the sulphuric acid ester of dodecyl alcohol are dissolved in 17 parts of water, the solution is added to 166.6 parts of 60% rubber latex. 10 parts of phenol are dissolved in 90 parts of hot water, allowed to cool and added with careful stirring to the above mixture. 100 parts of 15% sulphuric acid are next added to the mixture, again with careful stirring. The mobile mixture is transferred to trays, dried at 60–70° C. then baked at 130–150° C. for two hours, milled, washed with water until acid free, and then milled until homogeneous.

Example 3

A solution of 3 parts of the sodium salt of hexadecyl sulphonic acid in 15 parts of hot water is added to 166.6 parts of 60% rubber latex, and the mixture treated further as described in Example 2.

Example 4

This is an example of the manufacture of solid compositions from the new adhesive materials.

A mixture of 100 parts of the product of Example 1, 5 parts zinc oxide and 10 parts sulphur is cured under 60 lb. steam pressure for 1 hour. The resulting product has the advantage of being oil-resistant and also resistant to light petroleum fractions, solvent naphtha, etc. It is, for instance, unaffected by contact with mineral oil at 160° C. for 1 hour.

Example 5

This is similar to Example 4, but a mixture of 80 parts rubber, 20 parts adhesive (prepared according to Example 1) 75 parts barytes, 10 parts zinc oxide, 0.5 parts Vulcafor MBT and 2.5 parts sulphur is cured at 40 lb. pressure for 30 minutes.

This product is also oil-resistant, being apparently unaffected by immersion in mineral oil for 20 days at room temperature.

Example 6

This is an example of the use of the adhesive for the production of microporous material.

The product obtained according to Example 1 is pulverized in a grinding mill, then sieved through 100 mesh sieve. The material in grain form is then placed in a mould form and moulded under about 1 ton/inch pressure. A microporous thermoplastic form is obtained.

Example 7

This is similar to Example 6 but a non-thermoplastic material is obtained.

1 part of the product of Example 1 is compounded with 10 parts by weight of sulphur and semi-vulcanized by heating at 141° C. for 30 minutes. After cooling it is pulverized and moulded under a pressure of 1 ton per square inch at 141° C. for 30 minutes. A non-thermoplastic microporous product is obtained.

Example 8

This is an example of the application of the new adhesive material to the production of a lacquer.

100 parts of the product of Example 1, 150 parts of titanium dioxide are incorporated together in a hot mill and dispersed in a suitable solvent such as solvent naphtha to form a fluid of suitable viscosity for spraying, painting or dipping.

These lacquers show excellent adhesion to metals, glass, wood, leather and rubber.

Example 9

A clear, almost colourless lacquer is obtained by dissolving the thermoplastic material in a suitable solvent.

Hard films are obtained by air-drying or baking.

Vulcanizing agents may be added to render the films non-thermoplastic.

We claim:

1. Process for the manufacture of adhesive materials which comprises adding to concentrated rubber latex about one-fourth of its weight of the sodium salt of the sulphuric acid ester of alcohols from spermaceti, adding to the mixture dilute sulphuric acid containing a weight of $H_2SO_4$ equal to about one-sixth of the weight of latex, drying the thickened mixture, and baking the dried mass at about 130° C. for about two hours.

2. A process for preparing adhesive materials which comprises incorporating, in a rubber latex, a stabilizer of the group consisting of aliphatic sulphonic acids, aliphatic sulphuric esters and their alkali and ammonium salts in which the aliphatic group contains an alkyl chain of at least 10 carbon atoms, adding to the stabilized latex in an amount at least sufficient to coagulate unstabilized latex an acid substance of the group consisting of sulphuric acid, phenolsulphonic acid, phosphoric acid, benzenesulphonic acid, acetylsulphuric acid and derivatives thereof adapted to release such acids, heating the mixture to remove volatile matter, and then baking the residuum until a chemical reaction takes place between the constituents of the latex and the acid substance.

3. A process for preparing adhesive materials which comprises incorporating, in a rubber latex, a stabilizer of the group consisting of alkyl sulphonic acids, alkyl sulphuric esters and their alkali and ammonium salts in which the alkyl group contains at least 10 carbon atoms, adding to the stabilized latex in an amount at least sufficient to coagulate unstabilized latex an acid substance of the group consisting of sulphuric acid, phenolsulphonic acid, phosphoric acid, benzenesulphonic acid, acetyl sulphuric acid and derivatives thereof adapted to release such acids, heating the mixture to remove volatile matter, and then baking the residuum until a chemical reaction takes place between the constituents of the latex and the acid substance.

4. A process which comprises incorporating, in a rubber latex, a stabilizer of the group consisting of aliphatic sulphonic acids, aliphatic sulphuric esters and their alkali and ammonium salts in which the aliphatic group contains an alkyl chain of at least 10 carbon atoms, adding to the stabilized latex in an amount at least sufficient to coagulate unstabilized latex an acid substance of the group consisting of sulphuric acid, phenolsulphonic acid, phosphoric acid, benzenesulphonic acid, acetyl sulphuric acid and derivatives thereof adapted to release such acids, heating the mixture to remove volatile matter, and then baking the residuum until a chemical reaction takes place between the constituents of the latex and the acid substance, adding sulphur thereto, and heating to vulcanize the resulting mix.

5. A process which comprises incorporating, in a rubber latex, a stabilizer of the group consisting of aliphatic sulphonic acids, aliphatic sulphuric esters and their alkali and ammonium salts in which the aliphatic group contains an alkyl chain of at least 10 carbon atoms, adding to the stabilized latex in an amount at least sufficient to coagulate unstabilized latex an acid substance of the group consisting of sulphuric acid, phenolsulphonic acid, phosphoric acid, benzenesulphonic acid, acetyl sulphuric acid and derivatives thereof adapted to release such acids, heating the mixture to remove volatile matter, and then baking the residuum until a chemical reaction takes place between the constituents of the latex and the acid substance, adding sulphur and rubber, and then heating to vulcanize the resulting mix.

6. A process for preparing adhesive materials which comprises incorporating, in a rubber latex, a stabilizer of the group consisting of aliphatic sulphonic acids, aliphatic sulphuric esters and their alkali and ammonium salts in which the aliphatic group contains an alkyl chain of at least 10 carbon atoms, adding to the stabilized latex in an amount at least sufficient to coagulate unstabilized latex sulphuric acid, heating the mixture to remove volatile matter, and then baking the residuum until a chemical reaction takes place between the constituents of the latex and the acid substance.

7. A process for preparing adhesive materials which comprises incorporating, in a rubber latex, a stabilizer of the group consisting of alkyl sulphonic acids, alkyl sulphuric esters and their alkali and ammonium salts in which the alkyl group contains at least 10 carbon atoms, adding to the stabilized latex in an amount at least sufficient to coagulate unstabilized latex sulphuric acid, heating the mixture to remove volatile matter, and then baking the residuum until a chemical reaction takes place between the constituents of the latex and the acid substance.

8. A process for preparing adhesive materials which comprises incorporating, in a rubber latex, as a stabilizer an alkali salt of an aliphatic sulphuric ester in which the aliphatic group contains an alkyl chain of at least 10 carbon atoms, adding to the stabilized latex in an amount at least sufficient to coagulate unstabilized latex an acid substance of the group consisting of sulphuric acid, phenolsulphonic acid, phosphoric acid, benzene sulphonic acid, acetylsulphuric acid and derivatives thereof adapted to release such acids, heating the mixture to remove volatile matter, and then baking the residuum until a chemical reaction takes place between the constituents of the latex and the acid substance.

9. A process for preparing adhesive materials which comprises incorporating, in a rubber latex, as a stabilizer an alkali salt of an alkyl sulphuric ester in which the alkyl group contains at least 10 carbon atoms, adding to the stabilized latex in an amount at least sufficient to coagulate unstabilized latex an acid substance of the group consisting of sulphuric acid, phenolsulphonic acid, phosphoric acid, benzenesulphonic acid, acetylsulphuric acid and derivatives thereof adapted to release such acids, heating the mixture to remove volatile matter, and then baking the residuum until a chemical reaction takes place between the constituents of the latex and the acid substance.

10. A process for preparing adhesive materials which comprises incorporating, in a rubber latex, as a stabilizer the sodium salt of the sulphuric acid ester of dodecyl alcohol, adding to the stabilized latex in an amount at least sufficient to coagulate unstabilized latex an acid substance of the group consisting of sulphuric acid, phenolsulphonic acid, phosphoric acid, benzenesulphonic acid, acetylsulphuric acid and derivatives thereof adapted to release such acids, heating the mixture to remove volatile matter, and then baking the residuum until a chemical reaction takes place between the constituents of the latex and the acid substance.

11. A process for preparing adhesive materials which comprises incorporating, in a rubber latex, as a stabilizer the sodium salt of the sulphuric acid ester of oleyl alcohol, adding to the stabilized latex in an amount at least sufficient to coagulate unstabilized latex an acid substance of the group consisting of sulphuric acid, phenolsulphonic acid, phosphoric acid, benzenesulphonic acid, acetylsulphuric acid and derivatives thereof adapted to release such acids, heating the mixture to remove volatile matter, and then baking the residuum until a chemical reaction takes place between the constituents of the latex and the acid substance.

HUGH MILLS BUNBURY.
ROBERT BERTRAM FISHER.
FRANK CLARKE.
WILLIAM JOHN ROY EVANS.